United States Patent
Yamamoto et al.

(10) Patent No.: US 12,332,435 B2
(45) Date of Patent: Jun. 17, 2025

(54) VEHICLE

(71) Applicant: MAXELL, LTD., Kyoto (JP)

(72) Inventors: Tomoki Yamamoto, Kyoto (JP); Toshinori Sugiyama, Kyoto (JP); Koji Hirata, Kyoto (JP); Masahiko Yatsu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/430,840

(22) Filed: Feb. 2, 2024

(65) Prior Publication Data

US 2024/0176139 A1   May 30, 2024

Related U.S. Application Data

(63) Continuation of application No. 16/622,370, filed as application No. PCT/JP2018/020215 on May 25, 2018, now Pat. No. 11,921,287.

(30) Foreign Application Priority Data

Sep. 4, 2017 (JP) .............................. 2017-169304

(51) Int. Cl.
*G02B 27/01* (2006.01)
*B60K 35/00* (2024.01)
(Continued)

(52) U.S. Cl.
CPC .......... *G02B 27/0101* (2013.01); *B60K 35/00* (2013.01); *G02B 5/0833* (2013.01);
(Continued)

(58) Field of Classification Search
CPC .. G02B 27/0101; G02B 5/0833; G02B 5/282; G02B 27/286; G02B 2027/014;
(Continued)

(56) References Cited

U.S. PATENT DOCUMENTS

| | | | | | |
|---|---|---|---|---|---|
| 4,973,132 | A | * | 11/1990 | McDonald | G02B 5/3083 359/13 |
| 5,059,957 | A | * | 10/1991 | Todoriki | G02B 27/01 340/459 |

(Continued)

FOREIGN PATENT DOCUMENTS

| CN | 103858028 A | 6/2014 |
|---|---|---|
| JP | 62-275845 A | 11/1987 |

(Continued)

OTHER PUBLICATIONS

International Search Report of PCT/JP2018/020215 dated Aug. 7, 2018.

(Continued)

*Primary Examiner* — Sharrief I Broome
(74) *Attorney, Agent, or Firm* — Mattingly & Malur, PC

(57) ABSTRACT

The information display apparatus has a housing with an opening and a transparent cover formed on the opening, the housing includes image-light generating means configured to generate image light that displays the image information and an optical system configured to allow a driver of the vehicle to recognize image information based on the image light from the image-light generating means as a virtual image in front of the windshield. When S-polarized light on the windshield is assumed to be a first polarized wave while polarized light that orthogonally crosses the S-polarized light in a polarizing direction is assumed to be a second polarized wave, the image-light generating means is configured to generate the image light made of the first polarized wave, and a transmittance/reflectance control means blocks a part of the first polarized wave and the second polarized wave of incident external light entering the housing from the opening.

7 Claims, 11 Drawing Sheets

(51) Int. Cl.
  *B60K 35/23*    (2024.01)
  *B60K 35/29*    (2024.01)
  *G02B 5/08*     (2006.01)
  *G02B 5/28*     (2006.01)
  *G02B 27/28*    (2006.01)

(52) U.S. Cl.
  CPC ........... *G02B 5/282* (2013.01); *G02B 27/286* (2013.01); *B60K 35/23* (2024.01); *B60K 35/29* (2024.01); *B60K 2360/18* (2024.01); *B60K 2360/23* (2024.01); *B60K 2360/25* (2024.01); *B60K 2360/27* (2024.01); *B60K 2360/31* (2024.01); *G02B 2027/014* (2013.01); *G02B 2027/0196* (2013.01)

(58) Field of Classification Search
  CPC ........... G02B 2027/0196; B60K 35/00; B60K 2360/27; B60K 2360/25; B60K 35/23; B60K 35/29; B60K 2360/18; B60K 2360/31; B60K 2360/23
  USPC ........................................................ 359/630
  See application file for complete search history.

(56) References Cited

U.S. PATENT DOCUMENTS

| | | | |
|---|---|---|---|
| 5,486,840 A | 1/1996 | Borrego et al. | |
| 7,320,534 B2 | 1/2008 | Sugikawa et al. | |
| 2006/0018119 A1* | 1/2006 | Sugikawa | G02B 27/0101 362/231 |
| 2009/0153953 A1 | 6/2009 | Banerjee et al. | |
| 2014/0184996 A1 | 7/2014 | Matsushita et al. | |
| 2014/0264202 A1 | 9/2014 | Nagaya et al. | |
| 2015/0022898 A1* | 1/2015 | Yamakawa | G02B 27/01 356/230 |
| 2015/0253582 A1 | 9/2015 | Sasaki et al. | |
| 2016/0178901 A1* | 6/2016 | Ishikawa | B60K 35/00 345/7 |
| 2016/0195719 A1 | 7/2016 | Yonetani | |
| 2016/0377776 A1 | 12/2016 | Ichihashi | |
| 2017/0192231 A1 | 7/2017 | Ichihashi et al. | |
| 2017/0299862 A1 | 10/2017 | Yamaguchi | |
| 2018/0081172 A1* | 3/2018 | Liu | G02B 27/286 |
| 2018/0164585 A1* | 6/2018 | Nambara | G02B 27/283 |
| 2018/0373028 A1* | 12/2018 | Yamaguchi | G02B 27/0101 |
| 2019/0235243 A1 | 8/2019 | Anzai et al. | |
| 2019/0255946 A1* | 8/2019 | Takahashi | G02B 17/0668 |
| 2019/0346676 A1* | 11/2019 | Hirata | H04N 9/3179 |
| 2020/0201037 A1* | 6/2020 | Yamamoto | G02B 27/283 |
| 2020/0377021 A1* | 12/2020 | So | B60R 1/12 |

FOREIGN PATENT DOCUMENTS

| | | |
|---|---|---|
| JP | 2006-039029 A | 2/2006 |
| JP | 4114194 B2 | 7/2008 |
| JP | 2013-057897 A | 3/2013 |
| JP | 2015-194707 A | 11/2015 |
| JP | 2016-065905 A | 4/2016 |
| JP | 2016-197173 A | 11/2016 |
| JP | 2017-009666 A | 1/2017 |
| JP | 2017-102347 A | 6/2017 |

OTHER PUBLICATIONS

Chinese Office Action received in corresponding Chinese Application No. 201880040531.X dated Apr. 1, 2021.

* cited by examiner

FIG. 5
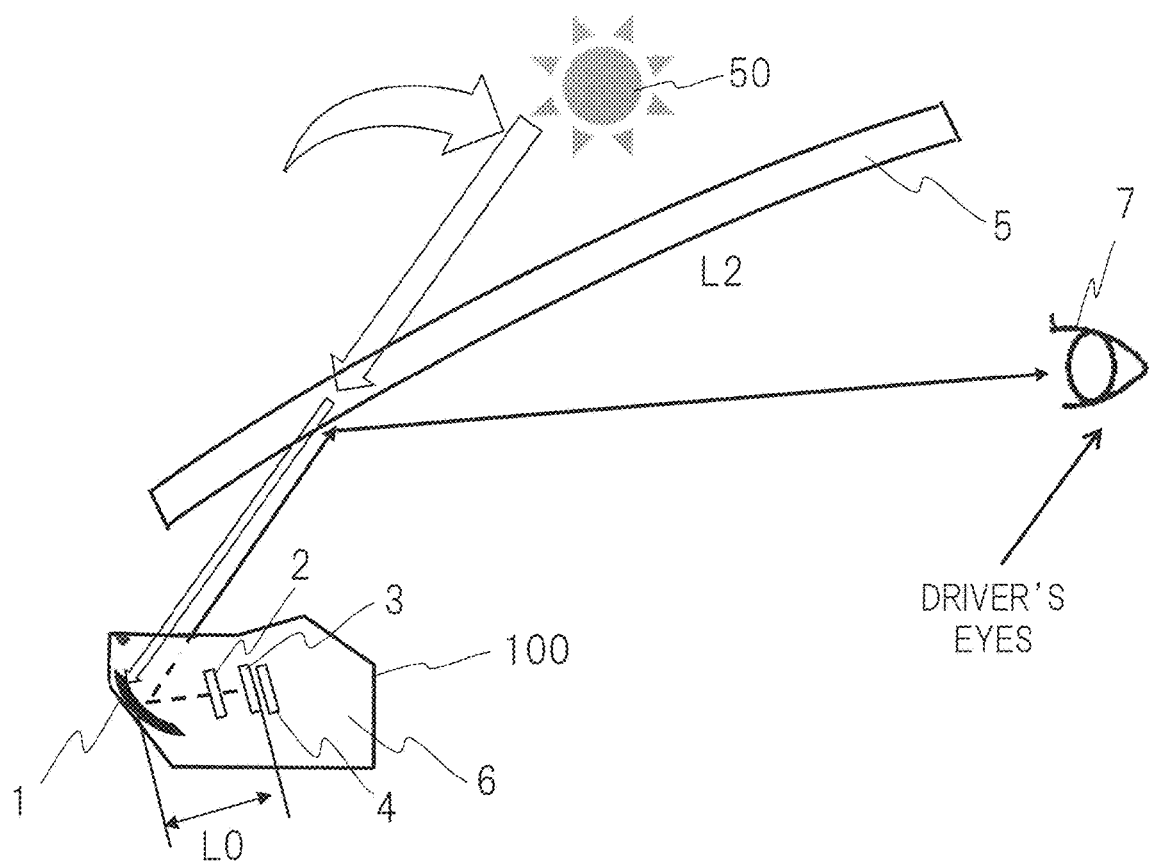
FIG. 6
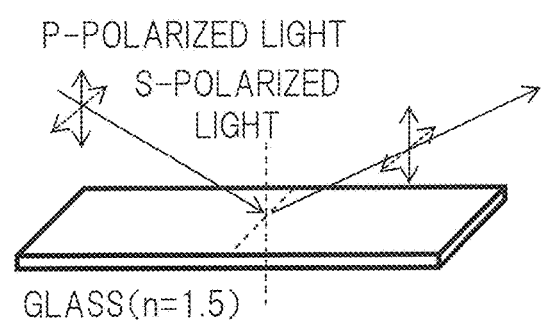
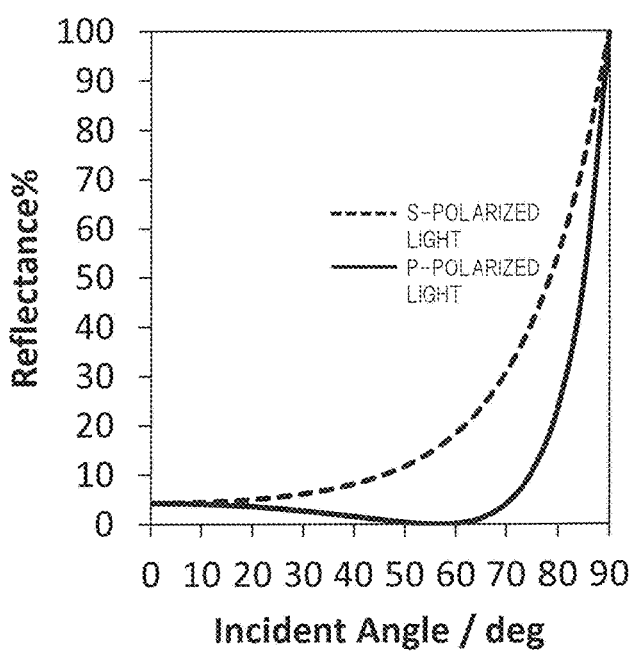

FIG. 11
(a) TOP VIEW, AT THE TIME OF EMISSION OF IMAGE DISPLAY LIGHT
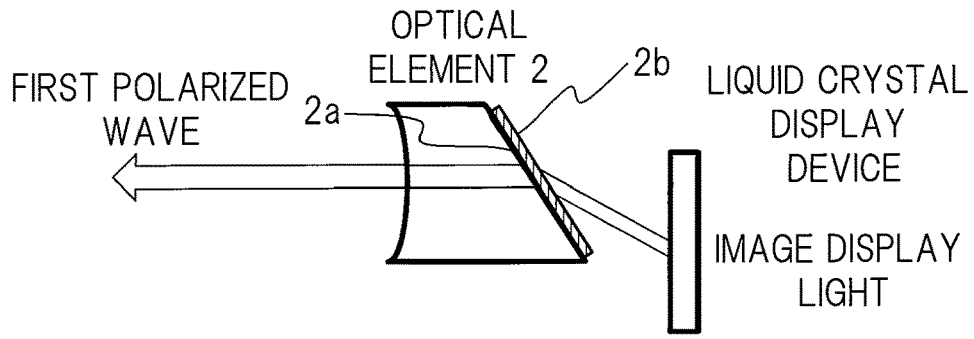
(b) TOP VIEW, AT THE TIME OF INCIDENCE OF EXTERNAL LIGHT
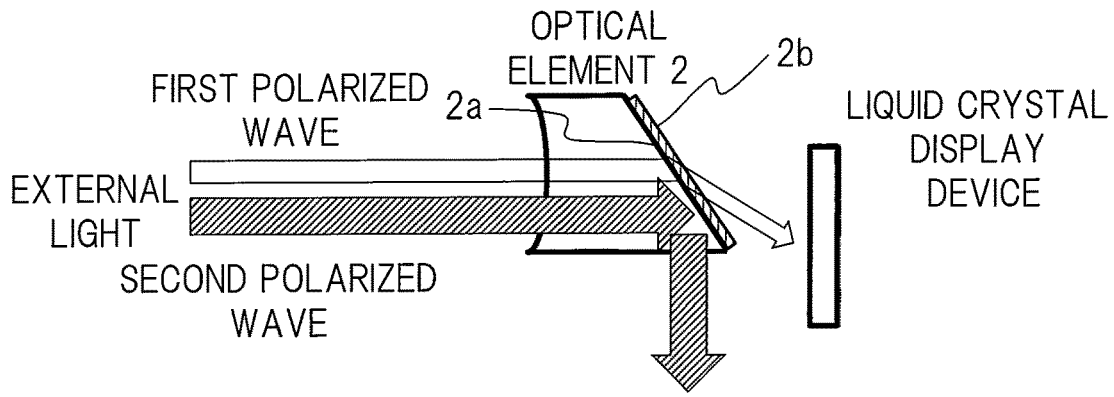
FIG. 12
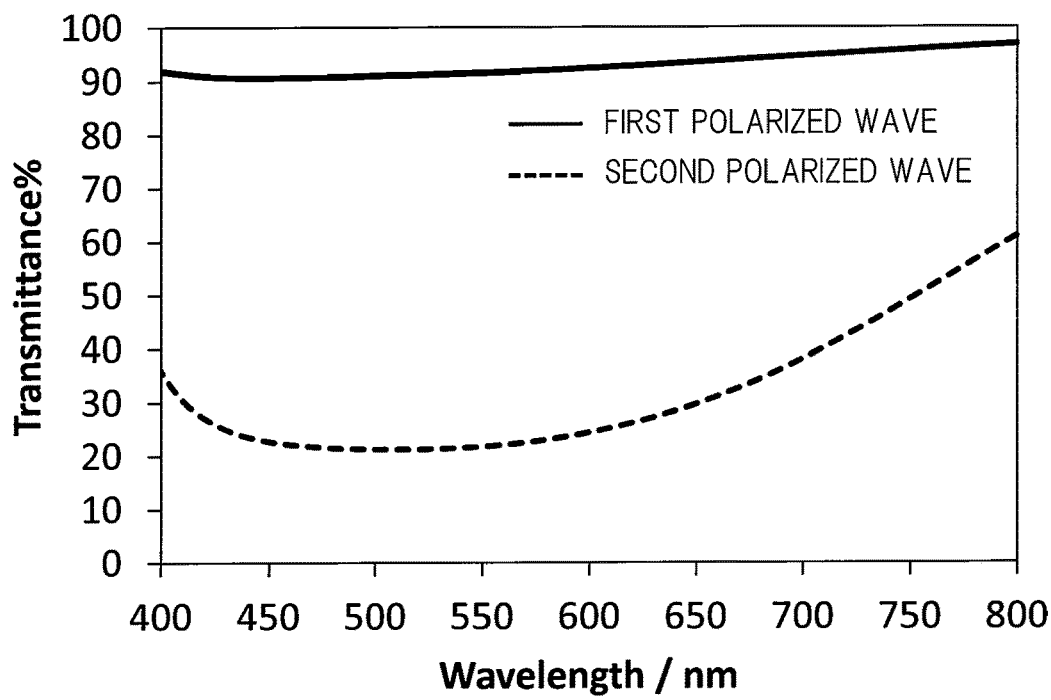

FIG. 13
(a) TOP VIEW, AT THE TIME OF EMISSION OF IMAGE DISPLAY LIGHT
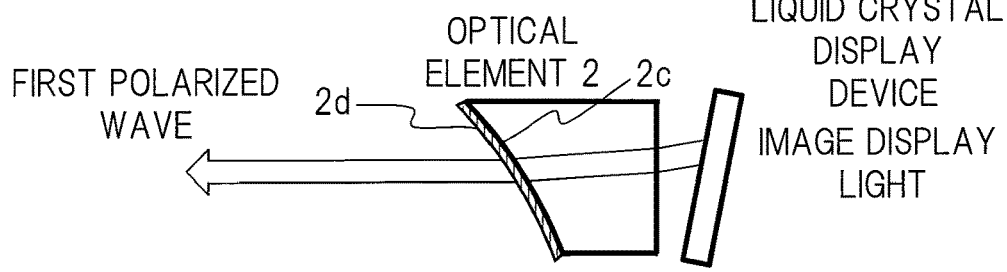
(b) TOP VIEW, AT THE TIME OF INCIDENCE OF EXTERNAL LIGHT
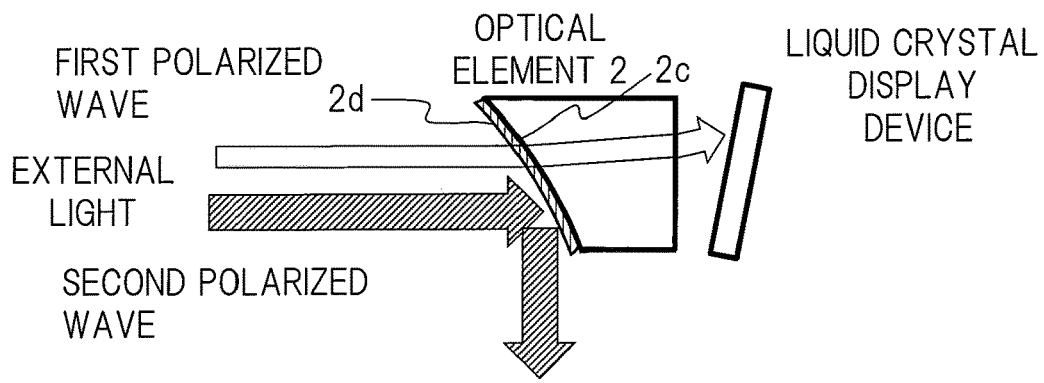
FIG. 14
(a) TOP VIEW, AT THE TIME OF EMISSION OF IMAGE DISPLAY LIGHT
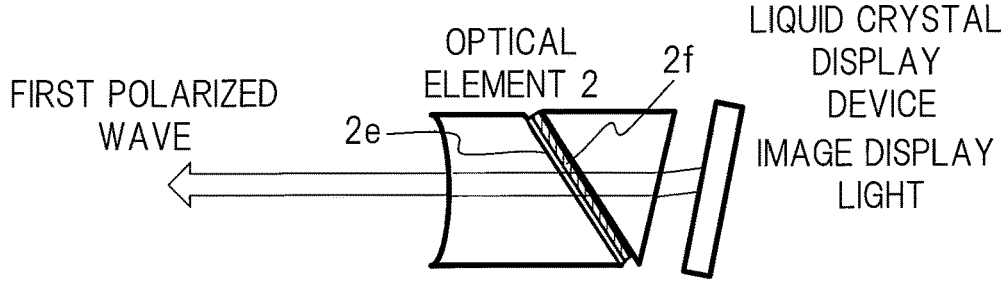
(b) TOP VIEW, AT THE TIME OF INCIDENCE OF EXTERNAL LIGHT
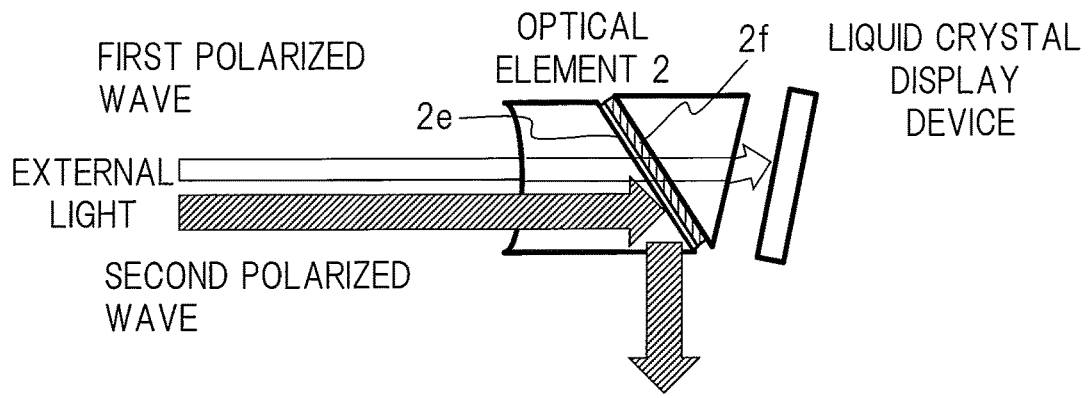

FIG. 15
(a) TOP VIEW, AT THE TIME OF EMISSION OF IMAGE DISPLAY LIGHT
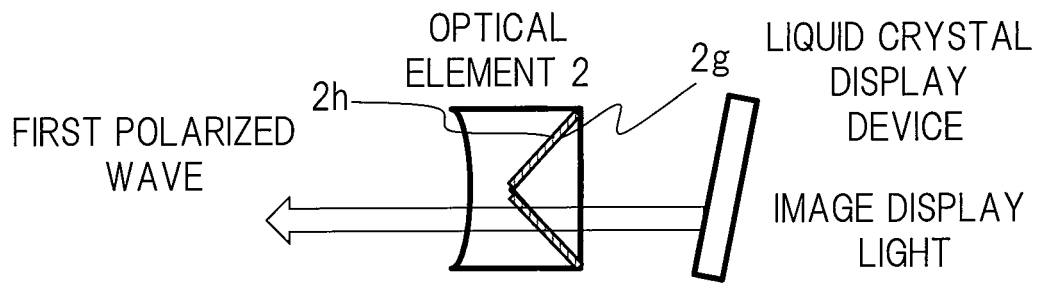
(b) TOP VIEW, AT THE TIME OF INCIDENCE OF EXTERNAL LIGHT
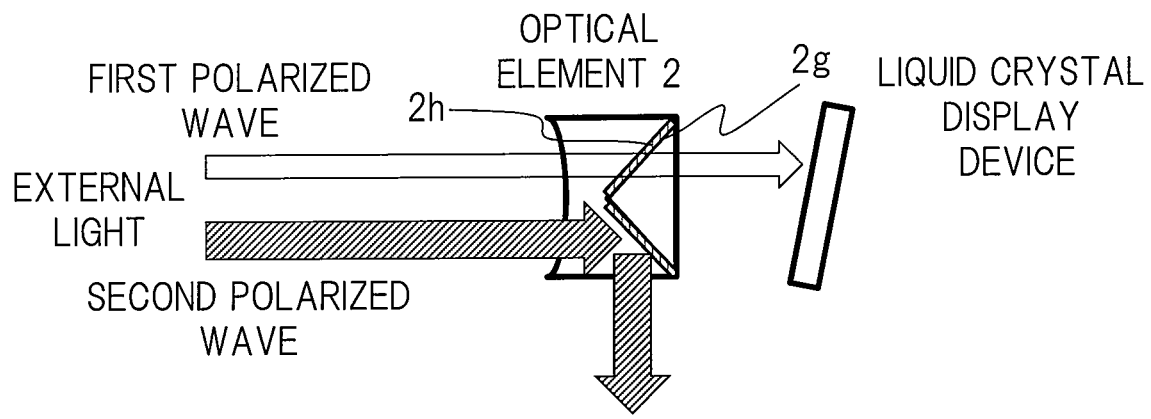

FIG. 16
(a) TOP VIEW, AT THE TIME OF EMISSION OF IMAGE DISPLAY LIGHT
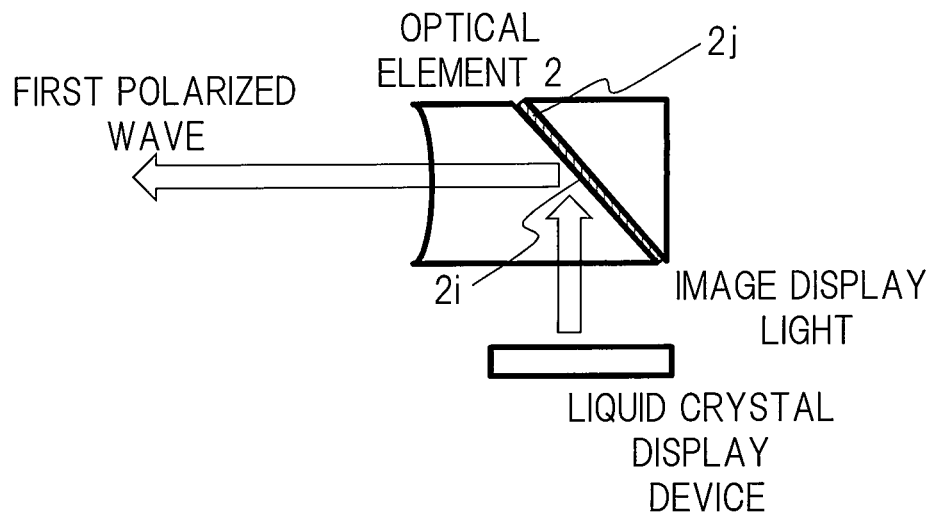
(b) TOP VIEW, AT THE TIME OF INCIDENCE OF EXTERNAL LIGHT
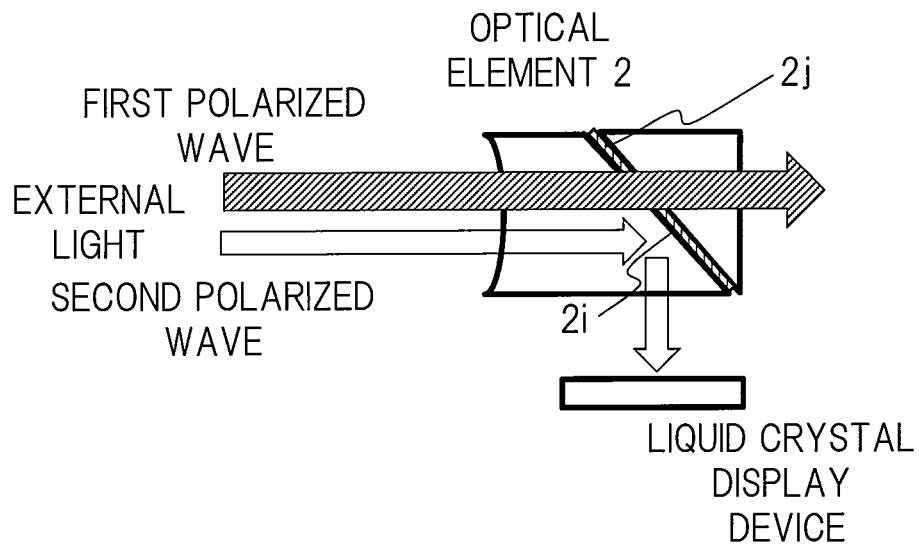

VEHICLE

TECHNICAL FIELD

The present invention relates to an information display apparatus projecting images onto a windshield or a combiner of a car, a train, an aircraft or others (hereinafter, also generally referred to as vehicle), and, more particularly, relates to a projecting optical system by which the images are observed through the windshield as virtual images, and relates to an information display apparatus using the projecting optical system.

BACKGROUND ART

In the following Patent Document 1, so-called head up display (HUD: Head Up Display) apparatus has been known, the head up display apparatus forming virtual images by projecting image light onto a windshield or a combiner of a car to display traffic information such as route information and traffic congestion information and car information such as a fuel level and a coolant temperature.

In such a type of the information display apparatus, it is desirable to enlarge a region where a driver can watch the virtual images while the virtual images are also desirable to have high definition with high visual recognition.

The head up display apparatus is an apparatus that provides a driver with the virtual images by enlarging the images displayed on an image display device by using an optical system including a concave mirror (functioning as a convex lens), and the windshield or the combiner is necessary as a last reflecting surface.

A liquid crystal display element is often used as the image display device used for the above-described head up display apparatus since the liquid crystal display element is comparatively inexpensive and easily causes high-quality images. On the other hand, the liquid crystal display element has a problem of significant reduction in a performance under a predetermined condition during daytime since solar light passes through the windshield and is collected by the concave mirror to damage a liquid crystal panel and a polarizing board.

Accordingly, for example, as already known by the following Patent Document 2, a display apparatus has been proposed, the display apparatus being configured to, by using a light polarizing member (film) pasted on a glass substrate arranged in front of a liquid crystal display element that is the image display device, transmit the polarized light that has been emitted from a light source and has penetrated the liquid crystal display element but to block a polarized component of the incident solar light entering the apparatus from outside, the polarized component being different in a light polarizing direction from the polarized light.

RELATED ART DOCUMENTS

Patent Documents

Patent Document 1: Japanese Patent Application Laid-Open Publication No. 2015-194707
Patent Document 2: Japanese Patent No. 4114194

SUMMARY OF THE INVENTION

Problems to be Solved by the Invention

However, in the above-described related art techniques, particularly in the Patent Document 2, it is difficult to secure flatness after the light polarizing member is pasted on the glass substrate, and there is a concern about reduction in the quality of the display images. Although described in details later, in an apparatus that is called AR (Augmented Reality)—HUD in recent years, a size of the concave mirror projecting and reflecting the image light toward the windshield or the combiner increases. Therefore, there is a concern about damage on the liquid crystal display element since much of the solar light is collected by the concave mirror and enters the apparatus.

Accordingly, an object of the present invention is to provide an information display apparatus having a configuration that reduces the damage on the liquid crystal display element due to the solar light by, more specifically, directly forming a dielectric multilayer film on a surface of a mirror or a lens, the dielectric multilayer film having a property that selectively reflects/transmits light in a desirable polarizing direction or with a desirable wavelength, and more reliably blocking/reducing the incident solar light entering the apparatus from outside without reduction in a quality of display images.

Means for Solving the Problems

According to the present invention, in order to achieve the above-described object, an information display apparatus displaying image information of a virtual image on a windshield or a combiner of a vehicle as described later in the claims is proposed, the information display apparatus having a housing that houses at least a part of the information display apparatus therein, a part of the housing having an opening and a transparent cover arranged on the opening, the housing including image-light generating means configured to generate image light displaying the image information and an optical system configured to allow a driver of the vehicle to recognize the image information of the image light from the image-light generating means as a virtual image in front of the e windshield, the image-light generating means being configured to generate the image light made of a first polarized wave when S-polarized light on the windshield is assumed to be the first polarized wave while polarized light that orthogonally crosses the S-polarized light in a polarizing direction is assumed to be a second polarized wave, and transmittance/reflectance control means configured to block a part of the first polarized wave and the second polarized wave of incident external light entering the housing from the opening being provided.

Effects of the Invention

According to the above-described present invention, the incident solar light entering the apparatus from outside can be more reliably blocked/reduced without reduction in a quality of display images, so that damage on a liquid crystal display element due to the solar light can be reduced.

BRIEF DESCRIPTIONS OF THE DRAWINGS

FIG. 5 is a schematic configuration diagram showing one embodiment of the information display apparatus that is a ray diagram showing a relation between the solar light and a virtual-image optical system of the information display apparatus according to the embodiment;

FIG. 6 is a schematic diagram for explaining change of a reflectance of a glass due to an incident angle based on S-polarized light and P-polarized light;

FIG. 11 is a schematic diagram showing a configuration of a lens according to the embodiment;

FIG. 12 is a diagram showing a transmission property of the lens according to an embodiment;

FIG. 13 is a schematic diagram showing a configuration of a lens according to an embodiment;

FIG. 14 is a schematic diagram showing a configuration of a lens according to an embodiment;

FIG. 15 is a schematic diagram showing a configuration of a lens according to an embodiment;

FIG. 16 is a schematic diagram showing a configuration of a lens according to an embodiment.

BEST MODE FOR CARRYING OUT THE INVENTION

Hereinafter, embodiments of the present invention will be described in detail with reference to the accompanying drawings and others. Note that the present invention is not limited to the following explanations, and various modifications and alterations can be made by those skilled in the art within the scope of the technical concept disclosed in the present specification. Also, components having the same function are denoted by the same reference symbols throughout all the drawings for describing: invention, and the repetitive description thereof may be omitted.

Outline of Information Display Apparatus

Figure 1:
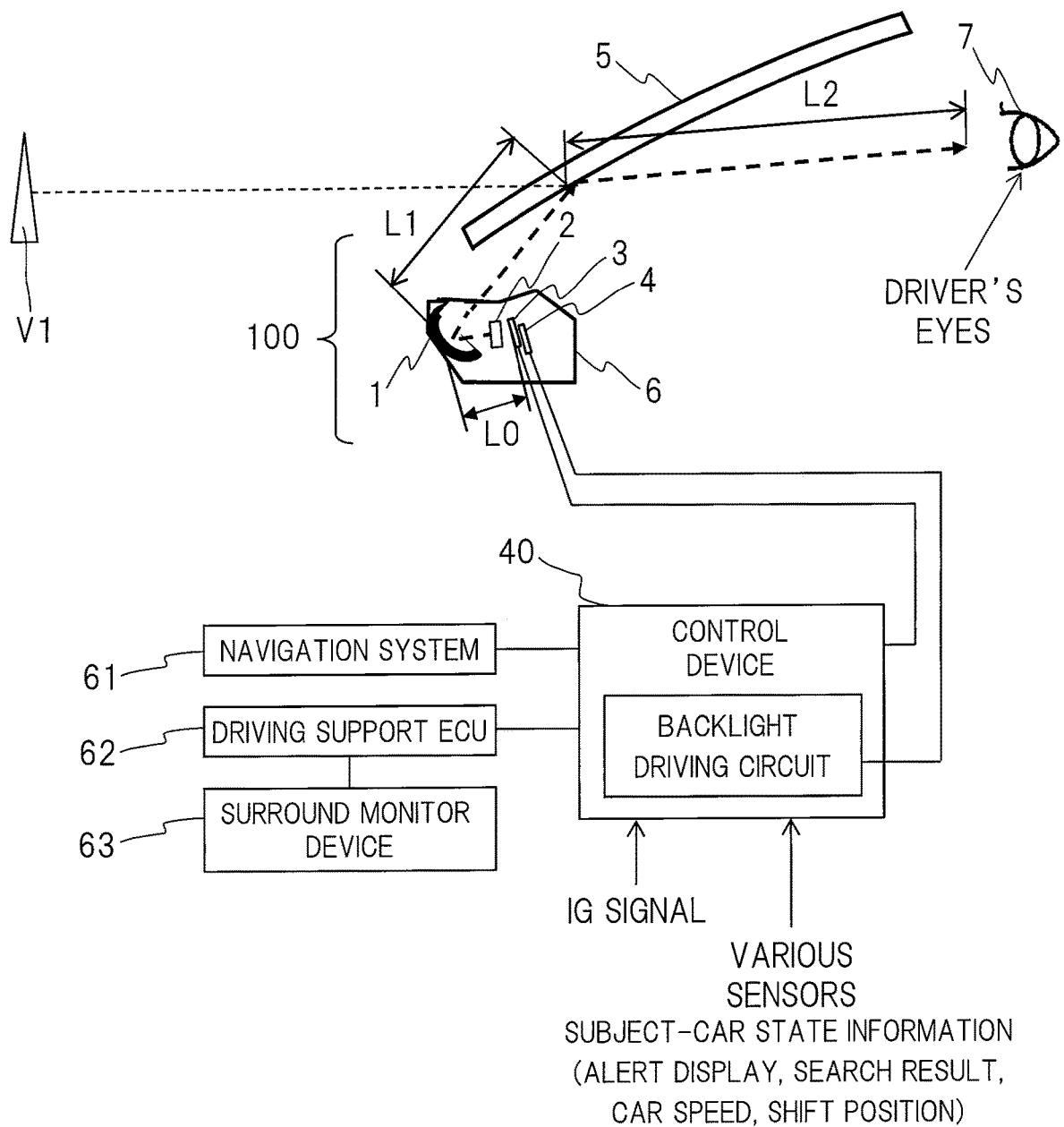
FIG. 1 is a schematic configuration diagram showing a peripheral equipment configuration of an information display apparatus according to one embodiment of the present invention.

FIG. 1 is a schematic configuration diagram showing a peripheral equipment configuration of an information display apparatus according to one embodiment of the present invention. Here, as one example, an information display apparatus 100 that projects images onto a windshield of a car will be particularly described.

As shown in FIG. 1, the information display apparatus 100 is an apparatus (so-called HUD (Head Up Display)) that displays various types of information reflected on a projection receiving member 5 (an inner surface of the windshield in the present embodiment) as a virtual image "VI" in order to form a virtual image "V1" on a line of sight of driver's eyes 7 in front of a subject car. Note that the projection receiving member 5 is only necessary to be a member on which the information is projected, and not only the windshield but also a combiner may be applicable and is simply referred to as "windshield" below. That is, in the information display apparatus 100 of the present embodiment, it is only necessary to allow the driver to visually recognize the virtual image formed on the line of sight of the driver's eyes in front of the subject car, and therefore, it would be obvious that the information displayed as the virtual image also contains, for example, vehicle information and information captured by a monitoring camera or a camera (not illustrated) such as a car surround view camera.

The information display apparatus 100 includes an image display device 3 that projects the image light displaying the information and a correcting optical element 2 for use in correcting distortion and aberration caused in the formation of the virtual image based on the image displayed on the image display device 3 by using the concave (free-form curved) mirror 1.

The information display apparatus 100 includes a control device 40 that controls the image display device 3 and a backlight 4. Note that optical components including the image display device 3, the backlight 4 and others configure a virtual-image optical system described later which includes a concave mirror 1 that reflects the light. The light that has reflected by these optical components is reflected on the projection receiving member 5, and is headed toward the driver's eyes 7 (Eye Box, Eye Point: see FIG. 4).

As the image display device 3, for example, not only an LCD (Liquid Crystal Display) having a backlight but also a self-luminous VFD (Vacuum Fluorescent Display) and others are cited.

Meanwhile, the images may be displayed on a screen by using a projection device in place of the image display device 3, be formed as the virtual image by using the concave mirror 1, be reflected on the windshield 5 or the combiner (not illustrated) that is the projection receiving member, and be headed toward the driver's eyes 7. Note that such a screen may be made of, for example, a micro lens array in which micro lenses are two-dimensionally arranged.

Here, in order to reduce the distortion of the virtual image, a shape of the concave (free-form curved) mirror 1 may be formed into a shape having an upper portion shown in FIG. 1 (a region on which light beam reflects on a lower side of the windshield 5 having a shorter distance from the point of view of the driver) having such a smaller curvature radius as causing a large enlargement factor while having a lower portion therein (a region on which the light beam reflects on an upper side of the windshield 5 having a longer distance from the point of view of the driver) having such a larger curvature radius as causing a small enlargement factor. Further, more favorable correction is achieved by causing the image display device 3 to tilt from an optical axis of the concave mirror to reduce the distortion itself caused by the correction of the difference in the virtual image magnification.

Figure 2:
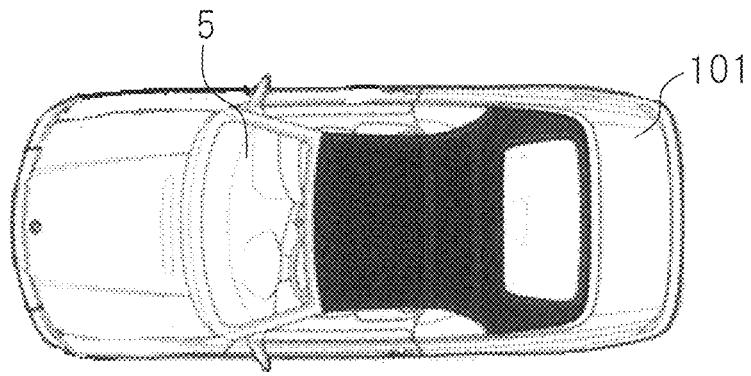
FIG. 2 is a top view of a car on which the information display apparatus is mounted.
Figure 3:
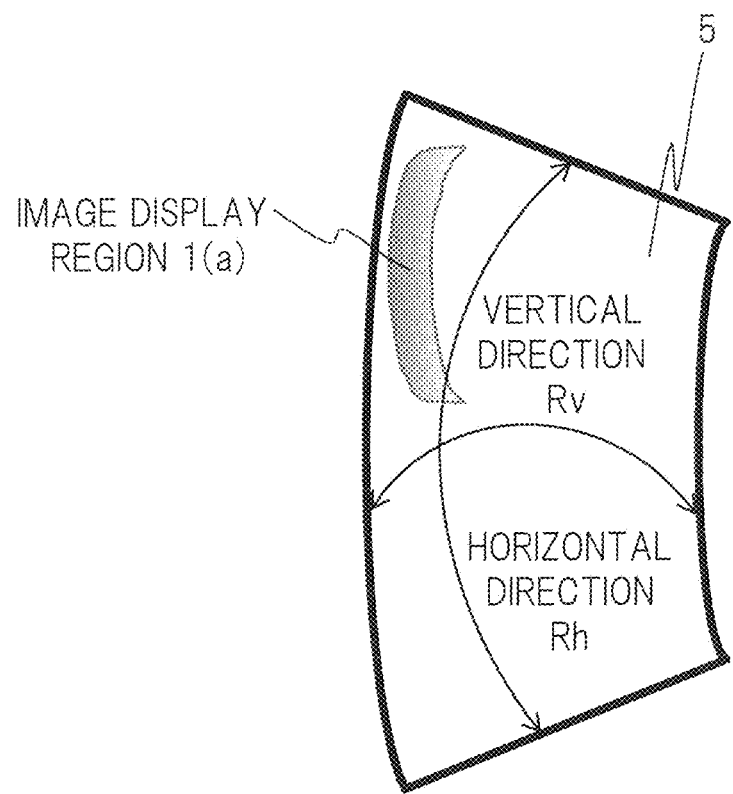
FIG. 3 is a diagram for explaining difference in a curvature radius of a windshield.

Meanwhile, as shown in FIGS. 2 and 3, in the windshield 5 of the car, a curvature radius "Rv" in a vertical direction of a body and a curvature radius "Rh" in a horizontal direction thereof are different from each other, and a relation of "Rh>Rv" is generally made. Therefore, when the windshield 5 is regarded as the reflecting surface, it becomes a toroidal surface of the concave mirror. Therefore, in the information display apparatus 100 of the present embodiment, the shape of the concave mirror 1 may have an average curvature radius that is different between the horizontal direction and the virtual direction so as to correct the virtual image magnification based on the shape of the windshield 5, that is, so as to correct the difference in the curvature radius between the virtual direction and the horizontal direction of the windshield 5. In this case, when the shape of the concave mirror 1 is a spherical surface shape or an aspherical surface shape that is symmetric with respect to the optical axis, the shape is expressed by a function of a distance "r" from the optical axis, and therefore, a horizontal cross-sectional shape and a vertical cross-sectional shape of separated portions cannot be independently controlled, and thus, it is preferable to correct the shape as the free-form curved surface by using a function of plane coordinates (x, y) from the optical axis of the mirror surface.

Here, return to FIG. 1 again for the explanation. For example, an optical element 2 is further arranged as a transmission-type optical component between the image display device 3 and the concave mirror 1 to control an emission direction of the light beam heading toward the concave mirror 1, so that the distortion is corrected in addition to the shape of the concave mirror 1. At the same time, the distortion of the virtual image including astigmatism caused by the difference between the curvature radius of the windshield 5 in the horizontal direction and the curvature radius thereof in the vertical direction is achieved.

In order to further enhance a distortion correcting ability, a plurality of lenses may be used as the optical element 2. Alternatively, the distortion can be reduced even by arrangement of a curved (free-form curved) mirror in place of the lenses so that an optical path is turned around and so that an incident position of the light beam entering the concave mirror 1 is simultaneously controlled. As also described above, it is needless to say that, even when the optical element that is suitably designed in order to improve the distortion correcting ability is further arranged between the concave mirror 1 and the image display device 3, this arrangement is not beyond the technical concept or scope of the present invention. Moreover, by change in a thickness of the above-described optical element 2 in the optical axis direction, an optical distance between the concave mirror 1 and the image display device 3 can be changed, so that the display position of the virtual image can be changed to be indiscrete from a far position to a close position in addition to the distortion correction that is an original purpose.

Besides, difference in the magnification of the virtual image between an up direction and a down direction may be corrected by arrangement of an image display device 3 that is tilted from a normal line of the optical axis of the concave mirror 1.

Meanwhile, as the light source, it is preferable to apply a solid light source having a long product life. Further, it is preferable to arrange optical means that decreases a light divergence angle as a LED (Light Emitting Diode) having smaller optical output change than ambient temperature change, and to perform the polarization conversion by using a PBS (Polarizing Beam Splitter).

Although not illustrated, a polarizing board is arranged in portions of the liquid crystal panel, the portions being closer to the backlight 4 (a light incident surface) and closer to the optical element 2 (a light emission surface), so that a contrast ratio of the image light is increased. When an iodine-based material having a high polarization degree is used for the polarizing board being closer to the backlight 4 (the light incident surface), a high contrast ratio can be obtained. On the other hand, when a dye-based polarizing board is used in the portion closer to the optical element 2 (the light emission surface), high reliability can be obtained even if the external light enters and if an environmental temperature is high.

In a case of usage of the liquid crystal panel as the image display device 3, particularly when the driver wears light-polarizing sunglasses, the case faces a trouble of the block of a specific polarized wave, which results in not allowing the driver to watch the image. In order to prevent the trouble, it is preferable to arrange a λ/4 board on a portion of the polarizing board of the liquid crystal panel being closer to the optical element 2, the portion being closer to the optical element, so as to convert the image light unified in a specific light polarizing direction into circular polarized light.

From such a navigation system 61, as front-scenery information (that is, information displayed on a front side of the subject car on the basis of the virtual image), the control device 40 acquires various types of information such as a speed limit and the number of traffic lanes on a road related to a current position of the running subject car and a route along which the subject car is scheduled to move and which is set on the navigation system 61.

A driving support "ECU 62" is a control device that achieves driving support control by controlling a driving system and a control system in accordance with an obstacle detected as a result of monitoring of a surround monitor device 63, and types of the driving support control include publicly-known techniques such as cruise control, adaptive cruise control, pre-crash safety and lane keeping assist.

The surround monitor device 63 is a device that monitors a surround state of the subject car, and examples of the device are a camera that detects an object existing around the subject car on the basis of an image obtained by capturing a subject-car's surround photograph, an external sensor that detects an object existing around the subject car on the basis of a result of transmission/reception of an exploration wave, and others.

As the front-scenery information, the control device 40 acquires such information (such as a distance to a vehicle ahead, a direction of the vehicle ahead, and positions of the obstacle and a road sign) from the driving support ECU 62. Further, to the control device 40, an ignition (IG) signal and subject-car state information are input. The subject-car state information of such information is information acquired as the vehicle information, and contains, for example, alert information indicating that a fuel level of an internal combustion or a coolant temperature, etc., becomes in a previously-defined abnormal state. Further, the information also contains a result of operation of a turn indicator, a running speed of the subject car, shift position information and others. The control device 40 as described above is activated when the ignition signal is input. The above is the explanation for the information display apparatus entire system of the present embodiment.

<Incidence of Solar Light Entering Apparatus and Method of Reducing the Solar Light>

Next, results of the present inventors' studies and others on the incidence of the solar light entering the information display apparatus in a driver's seat of the vehicle will be described below.

Figure 4:
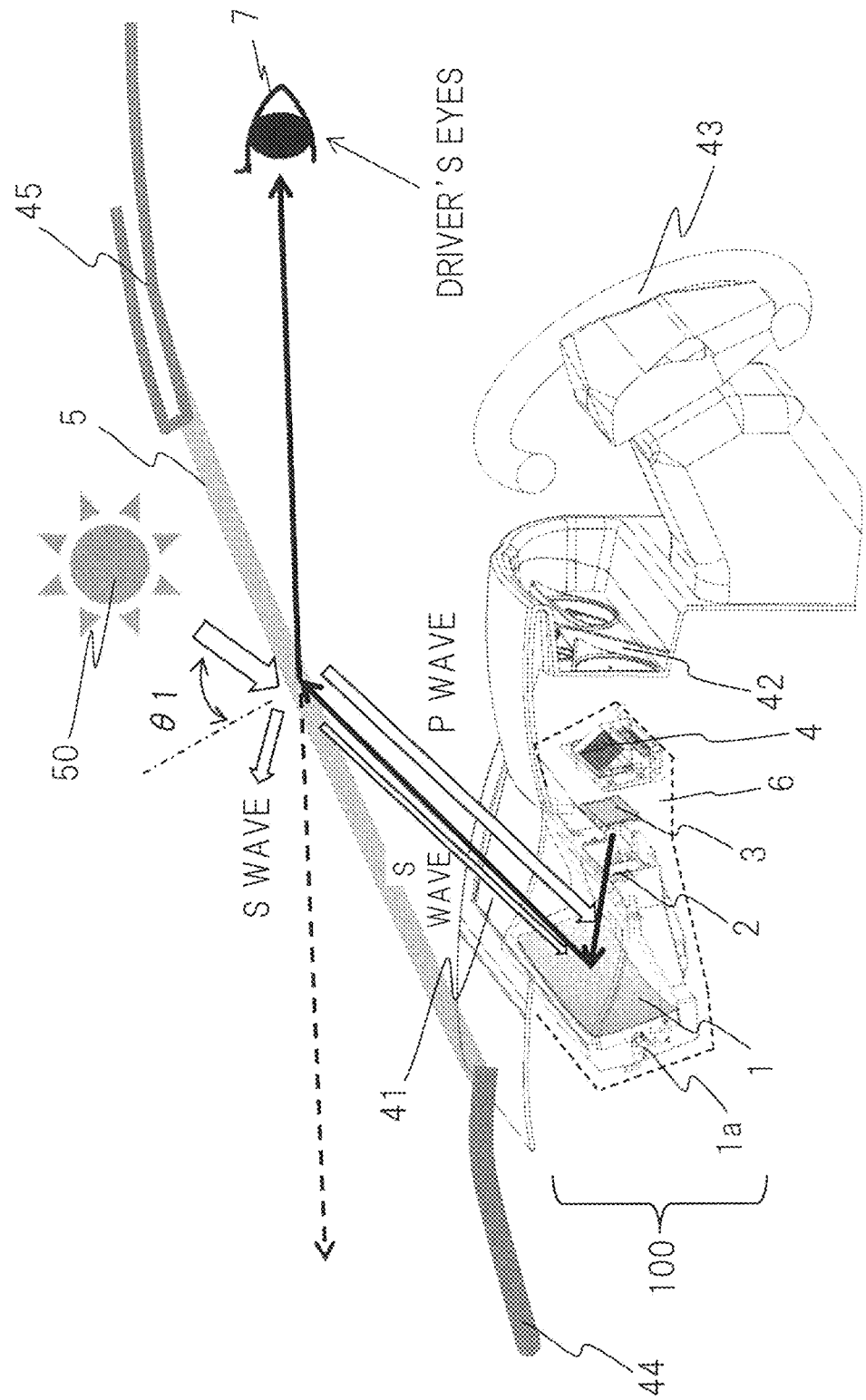
FIG. 4 is a schematic configuration diagram showing the information display apparatus, the windshield and a point-of-view position of a driver.

FIG. 4 shows a state in vicinity of the driver's seat of the vehicle, and the above-described information display apparatus 100 is arranged on, for example, a portion below the windshield 5 attached between a bonnet 44 and a top plate 45 configuring a vehicle body, the portion being closer to the bonnet of a dashboard including meters and gauges such as a speed meter 42. This drawing shows the sun 50 during daytime above the vehicle in addition to a handle 43 of the vehicle and the driver's eyes 7 corresponding to the driver. In FIG. 5, the sun 50, the windshield 5 and the driver's eyes 7 are particularly extracted and illustrated from the above-described state.

The intense light from the sun 50 enters the windshield 5 of the vehicle at an incident angle "θ1" as shown with a blank arrow in FIGS. 4 and 5, and a part of the light is reflected by the windshield 5, and then, the rest of the light passes through an opening 41 formed on an upper portion of the information display apparatus 100, and goes into the information display apparatus 100. At this time, particularly at an incident angle that is equal to or larger than 50 degrees, much of an S-polarized light component (defined below as "first polarized wave") of the solar light on the windshield is reflected on the windshield 5 as shown in FIG. 6. As a result, much of the incident solar light entering the information display apparatus 100 becomes a P-polarized light component (defined below as "second polarized wave") on the windshield (see a blank arrow of FIG. 5).

On the other hand, the emitted image light from the information display apparatus 100 is reflected on the windshield 5 or the combiner (not illustrated) and enters the driver's eyes 7 as shown with a solid arrow in FIGS. 4 and 5.

More specifically, the natural light such as the solar light from outside exists in a mix state of the first polarized wave and the second polarized wave. In a region where the incident angle on the windshield exceeds 50 degrees as described above, a reflectance on the glass surface depends on the first polarized wave: S-polarized light, the second polarized wave: P-polarized light, and the incident angle.

Accordingly, in the present invention, on the basis of the above-described findings, that is, in consideration of the fact that much of the incident solar light through the windshield 5 is the second polarized wave component, it has been verified that it is particularly effective to reduce the second polarized wave component in order to block the solar light entering the information display apparatus 100 and to use the first polarized wave component as the image light projected from the information display apparatus 100.

Further, for the block of the solar light, it is also effective to reduce UV (Ultraviolet) rays (to 400 nm), IR (Infrared) rays (from 800 nm) and a part of visible light rays (400 nm to 800 nm), more specifically, reduce a wavelength range that is not used for the image light.

Specific Example of Information Display Apparatus

Subsequently, a more specific optical configuration of the information display apparatus 100 configured on the basis of the above-described findings will be described below.

Figure 7:
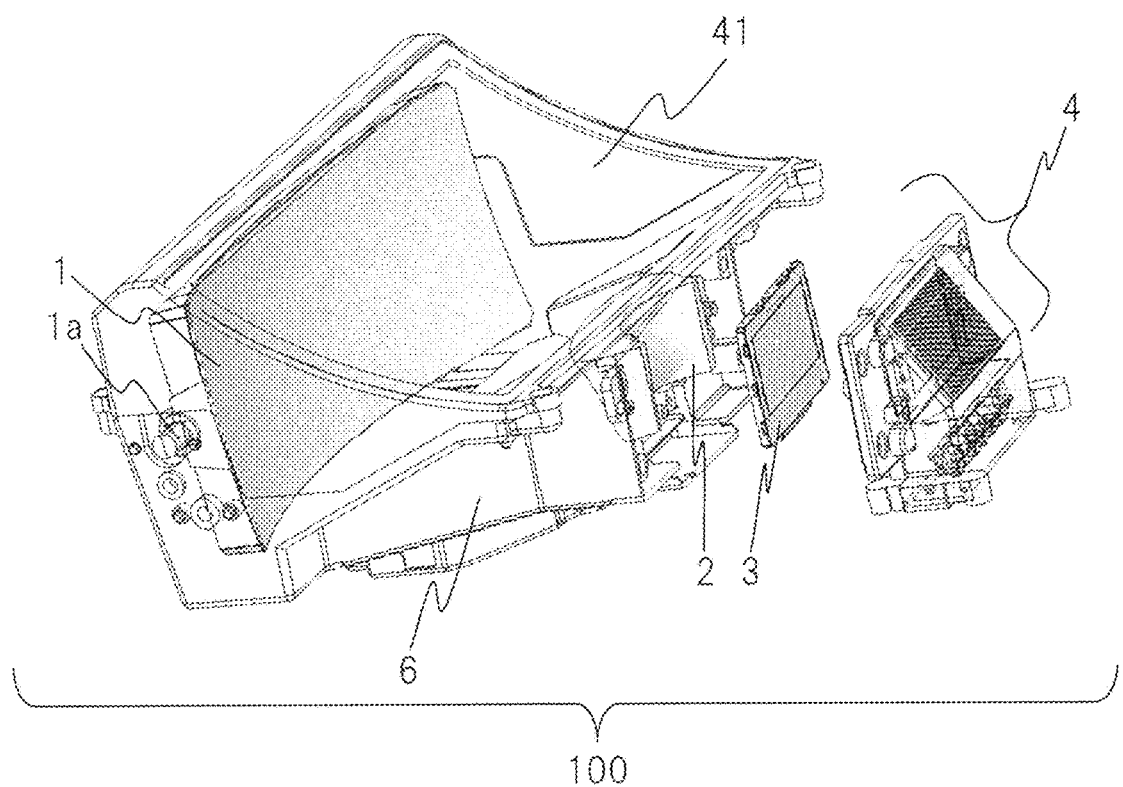
FIG. 7 is a schematic configuration diagram showing one embodiment of the information display apparatus.

FIG. 7 shows an entire configuration of the information display apparatus 100 that includes the concave (free-from curved) mirror 1 that projects the image light forming the virtual image through the windshield 5, the correcting optical element 2 for use in collecting the distortion and the aberration caused at the time of the projection, the image display device 3, and the light source device 4 configuring the backlight, that are sequentially arranged from a downstream side as described above. In order to reduce the second polarized wave component of the solar light entering the information display apparatus 100 and light having a wavelength not used for the image light in the first polarized wave component, in the present embodiment, a film (a dielectric multilayer film) that efficiently reflects light having a wavelength used for the image light but transmits the UV, the IR and the visible light having wavelengths that are different from the above-described wavelength is formed on a surface of the concave mirror 1, and a film (a dielectric multilayer film) that efficiently transmits the first polarized wave component used for the image light but reflects the second polarized wave component is formed on one surface of the correcting optical element 2.

By the film (dielectric multilayer film) formed on the surface of the concave (free-form curved) mirror 1, in the arrangement of the HUD apparatus (particularly AR (Augmented Reality) —HUD having a large concave mirror) that is the information display apparatus 100, the UV, the IR and a part of the visible light can be eliminated (transmitted) on the concave (free-form curved) mirror 1 on which the most of the solar light is collected. By this manner, that is, particularly by such arrangement of the concave (free-form curved) mirror 1 as being the farthest from the image display device 3 in the optical system of the apparatus, the optical element 2 and the image display device 3 can be efficiently prevented from being heated at a high temperature and damaged by arrival of the UV, the IR and a part of the visible light at the optical element 2 and the image display device 3.

<Film on Surface of Concave (Free-From Curved) Mirror>

Figure 8:
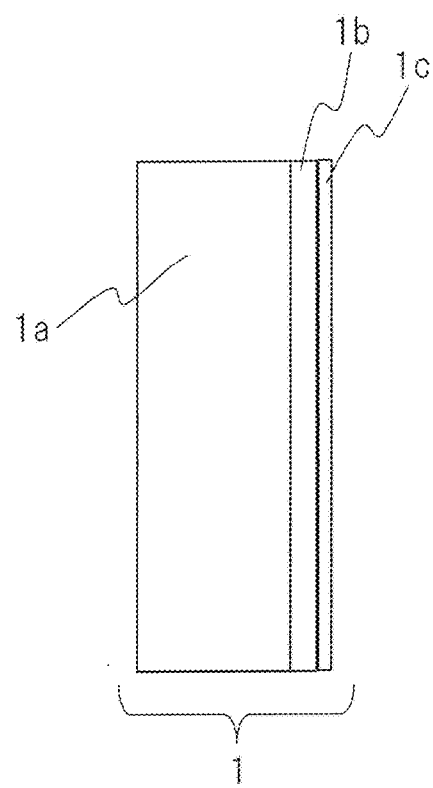
FIG. 8 is a schematic diagram showing a configuration of a concave mirror according to an embodiment.
Figure 9:
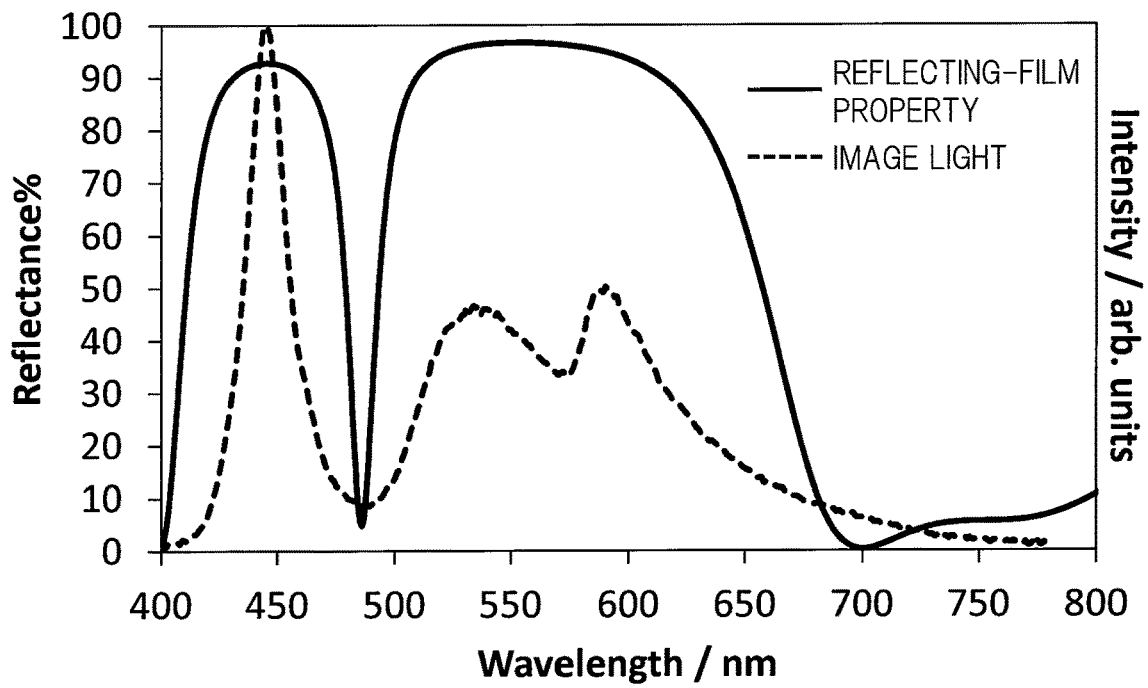
FIG. 9 is a diagram showing a reflection property of the concave mirror according to an embodiment.

More specifically, in the present embodiment, as shown in FIG. 8, a reflection film "1b" that transmits the IR and the UV visible but selectively reflects light having specific wavelengths (wavelength: about 400 to 700 nm) used for the image light as shown in FIG. 9 is formed on a surface of a base member "1a" of the concave (free-form curved) mirror 1 made of plastic or others. A protection film "1c" that protects the reflection film is formed on an air-side portion of the reflection film, so that scratch resistance can be improved.

For the base member "1a" of the concave (free-form curved) mirror, a high transparent material is selected so that the base member does not absorb the unreflected wavelength component light of the solar light. As the high transparent material for the plastic-made base member, ZEONEX (registered trademark) produced by Zeon corporation, polycarbonate, acrylic or others is applicable. The ZEONEX having a water absorption rate that is nearly 0% and having a high heat distortion temperature is suitable but expensive. Therefore, it is better to use the polycarbonate having the similar heat distortion temperature and a water absorption rate that is about 0.2%, with devisal. The acrylic having the highest formability and being inexpensive has the highest water absorption rate, and therefore, it is essential that a water proof film and a reflection film should be formed.

Figure 10:
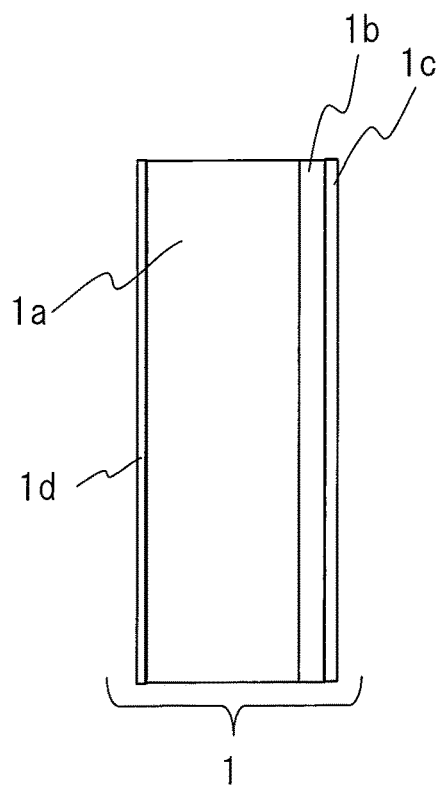
FIG. 10 is a schematic diagram showing a configuration of a concave mirror according to the embodiment.

In order to prevent the base member of the concave (free-form curved) mirror from absorbing the moisture, it is better to form the reflection film formed on the reflecting surface as shown in FIG. 10, and besides, a moisture proof film "1d" obtained by forming a film of, for example, SiN (silicon nitride) as the moisture proof film on an opposite surface. The SiN film that is the moisture proof film 1d transmits the solar light, and therefore, the light absorption does not occur in the base member, so that the heat distortion can be suppressed. As a result, the shape change of the polycarbonate-made or the acrylic-made concave (free-form curved) mirror due to the moisture absorption can be prevented.

In order to prevent the solar light passing through the concave (free-form curved) mirror to which the above-described technique is applied from scattering inside the information display apparatus, it is better to form a holding unit (not illustrated) made of a light absorbing material, on a rear surface of the concave mirror shown in FIG. 10 for heat release.

<Film on Lens Surface>

Meanwhile, by the film (dielectric multilayer film) formed on the surface of the lens 2, the part of the second polarized wave component of the solar light entering the information display apparatus 100 can be eliminated (reflected). More specifically, in the present embodiment, a lens surface "2a" of the lens surface, the lens surface 2a being closer to the liquid crystal display device, is arranged so that a plane made by a normal line of the lens surface 2a and the optical axis vertically crosses the polarizing direction of the second polarized wave component as shown in FIG. 11, and a polarizing film "2b" that transmits the first polarized wave that is the image light but reflects the second polarized wave of the incident solar light is arranged on the lens surface 2a as shown in FIG. 12.

As the means that eliminates the second polarized wave component of the incident solar light by using the film (dielectric multilayer film) formed on the lens surface described above, the following modification examples are further applicable. A lens surface "2c" of the lens surface, the lens surface 2c being closer to the concave mirror, is arranged so that a plane made by a normal line of the lens surface 2c and the optical axis vertically crosses the polarizing direction of the second polarized wave component as shown in FIG. 13, and a film "2d" that transmits the first polarized wave that is the image light but reflects the second polarized wave of the incident solar light is arranged on the lens surface 2c as shown in FIG. 12.

When it is difficult to tilt the lens surface, the lens may be divided into two sections as shown in FIG. 14, and a tilted surface "2e" may be arranged inside. A film (a dielectric multilayer film) "2f" is formed on the tilted surface 2e so as to transmit the first polarized wave that is the image light but reflects the second polarized wave of the incident solar light.

Further, when it is necessary to thin the lens, as shown in FIG. 15, the lens may be divided, and a tilted surface "2g" may be arranged. A film (a dielectric multilayer film) "2h" is formed on the tilted surface 2g so as to transmit the first polarized wave that is the image light but reflects the second polarized wave of the incident solar light.

As another modification example, an aspect shown in FIG. 16 is also applicable. In this aspect, the lens is divided into two sections, a tilted surface "2i" inside the lens is arranged so that a plane made by a normal line of the tilted surface 2i and the optical axis is matched with the polarizing direction of the second polarized wave, and a film "2j" that reflects the first polarized wave that is the image light but transmits the second polarized wave of the incident solar light is arranged. Also in the present embodiment, note that the tilted surface forming the film may be arranged so that an incident surface or an emission surface of the lens is tilted.

Although not illustrated here, the above-described optical element 2 may have a form in which prisms are pasted so that the film (dielectric multilayer film) is formed on the pasted surface.

As the above-described characteristics of the films (dielectric multilayer films) formed on the concave mirror and the lens surface, another modification example is considered. Although not illustrated here, a film (a dielectric multilayer film) that transmits the ultraviolet rays and the infrared rays and has a higher reflectance to the first polarized wave than a reflectance to the second polarized wave in the visible light range is formed on the surface of the concave mirror, and a film (a dielectric multilayer film) that selectively transmits light with a specific wavelength of the visible light range used for the image light is formed on the lens surface. In this modification example, note that the lens surface may be not tilted.

Further, although not illustrated here, in addition to the concave (free-from curved) mirror 1 having the above-described function of eliminating the part of the IR and the UV, the opening 41 formed above the information display apparatus 100 may have the function of eliminating the IR and the UV, or may be provided with a light passing board (transparent cover) having a higher transmittance for the first polarized wave than a transmittance for the second polarized wave. In this case, note that not only the function of reducing the second polarized wave but also prevention of the entry of external dusts into the information display apparatus 100 can be achieved.

As described above, the concave mirror 1, the optical element 2 and the light passing board (transparent cover) formed on the opening 41 of the housing 6 as described above can eliminate the unnecessary components (the IR and the UV) for the information display apparatus among the incident solar light containing a large number of spectrum components entering from the opening 41 into the information display apparatus 100, and eliminate the second polarized wave of the solar light, and can mainly selectively extract the visible light component.

The above-described optical configuration of the information display apparatus 100 eliminates the unnecessary IR and UV from the incident solar light entering the apparatus through the windshield 5, and effectively reduces the second polarized wave component of the solar light that exerts the bad influence such as carbonization on the image display device 3, the peripheral polarizing board and others and reduces the light with the wavelength not used for the image light in the first polarized wave component. That is, the damage on the liquid crystal display element and the polarizing board due to the solar light can be reduced, and the reduction of the performance of the information display apparatus 100 due to the solar light can be suppressed.

<Other Countermeasures Against Solar Light>

During the operation of the above-described information display apparatus 100, the unnecessary IR and UV and the second polarized wave of the solar light can be eliminated by the dielectric multilayer film formed on the reflecting surface or the transmitting surface of the concave (free-form curved) mirror 1 or the lens 2 or by the light passing board (transparent cover) arranged on the opening 41. However, for example, when the vehicle stops in a parking lot or others in an engine stop state or when a transmission system is set to a parking state or a neutral state, the operation of the information display apparatus 100 is unnecessary. Accordingly, in such states, it is preferable to eliminate the incident solar light entering from a general optical path, that is, it is preferable not to allow the incident solar light to enter the information display apparatus 100 through the opening 41 above it and pass through the optical path reaching the image display device 3, the peripheral polarizing board and others.

Figure 17:
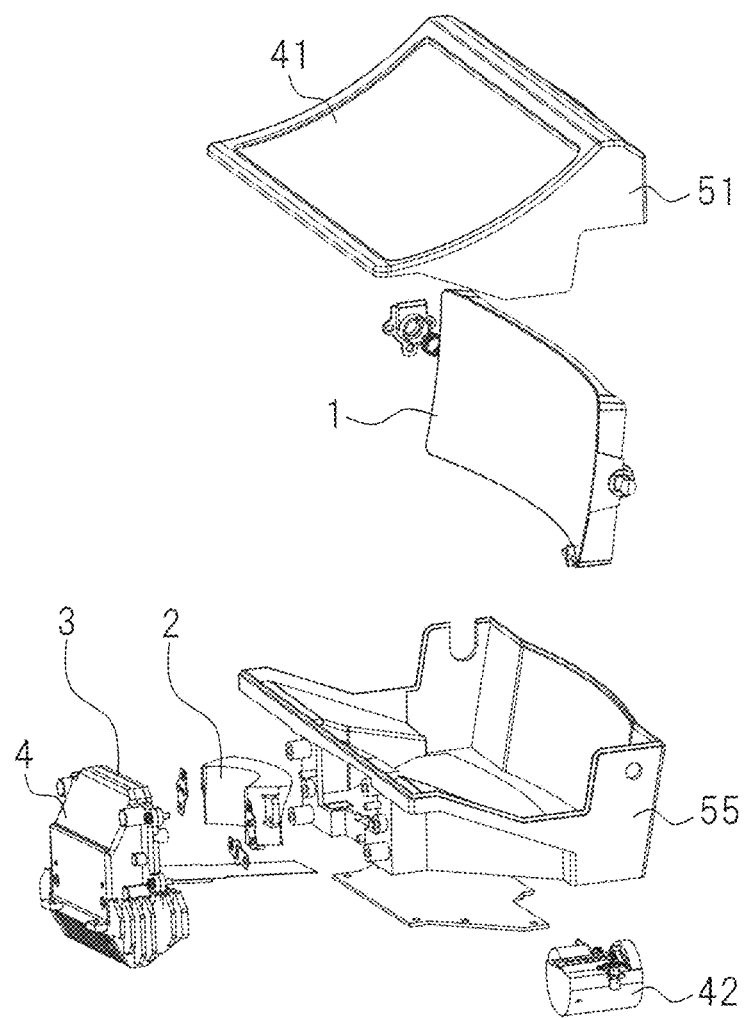
FIG. 17 is a schematic diagram showing a configuration of an information display apparatus of an embodiment.

As shown in FIG. 17 that is an exploded perspective view showing each component of the information display apparatus 100 to be viewed from a rear side while the apparatus is dissolved as one example, the concave mirror 1 attached into package cases 51 and 55 so as to be rotatable is moved to a previously-set position at which the incident soar light is reflected in a direction not reaching the image display device 3 (a direction that is different from the general optical path) by a concave-mirror driving unit 42 configured of an electric motor or others for use in adjusting a position of the concave mirror 1. According to this manner, by change of an optical path in which the incident light oppositely travels particularly at the time of the stoppage of the vehicle or others at which the incident solar light becomes the problem, the image display device 3 and the peripheral polarizing board, besides, the backlight 4 and others that are the optical components of the information display apparatus can be more reliably prevented from being broken and damaged by the solar light even under the intense solar light in summer or others.

That is, when the information display apparatus is not used, the concave mirror is rotated at a predetermined angle so as not to cause the solar light to return to the image display device, so that the solar light collected by the concave mirror is prevented from returning to the image display device, and therefore, the information apparatus display having significantly-improved light resistance against the solar light can be provided.

In the foregoing, the various embodiments have been concretely described in details. However, the present invention is not limited to only the foregoing embodiments, and includes various modification examples. For example, in the above-described embodiments, the entire system has been explained in details for simply explaining the present invention, and the embodiments are not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part 5 of the structure of each embodiment.

EXPLANATION OF REFERENCE CHARACTERS

100 . . . information display apparatus, 101 . . . car, 1 . . . concave mirror, 2 . . . optical element, 3 . . . image display device (liquid crystal display element, liquid crystal display panel), 5 . . . projection receiving member (windshield), 6 . . . housing, V1 . . . virtual image, 7 . . . eye box (driver's eyes), 4 . . . light source device (backlight), 41 . . . opening

The invention claimed is:

1. A vehicle configured to display image information of a virtual image onto a front of the vehicle, comprising:
a windshield;
a housing including an opening;
an image displaying portion emitting, as image light, incident light from a light source; and
an image-light projecting portion projecting the image light emitted from the image displaying portion toward the windshield, and being housed in the housing,
wherein the image displaying portion is arranged to tilt from an optical axis of the image-light projecting portion,
wherein a light processing portion blocking a part of external light entering the housing from the opening is provided,
the light processing portion is made of at least one or more reflecting member(s),
a dielectric multilayer film is formed on a reflecting surface of the reflecting member,
a spectrum of the image light has a peak at least at two wavelength ranges of a visible light range and has a valley at least at one wavelength range of the visible light range, and
in the dielectric multilayer film, a reflectance at the wavelength range of the valley is lower than a reflectance at the wavelength range of the peak.

2. The vehicle according to claim 1,
wherein the light processing portion is a driving portion adjusting an angle of the image-light projecting portion, and
wherein, when the vehicle stops, the driving portion adjusts the image-light projecting portion to be at a predetermined angle at which the external light entering the housing is reflected in a direction not extending toward the image displaying portion.

3. The vehicle according to claim 1,
wherein the light processing portion is made of at least one or more transmitting member(s).

4. The vehicle according to claim 3,
wherein a reflecting surface of the reflecting member reflects light with a wavelength used for the image light but transmits light with a wavelength not used for the image light.

5. The vehicle according to claim 4,
wherein a second reflecting member different from the reflecting member reflects visible light becoming light of S-polarization as a polarizing direction on the windshield but transmits visible light becoming light of P-polarization as the polarizing direction on the windshield.

6. The vehicle according to claim 3,
wherein the transmitting member transmits visible light becoming light of S-polarization as a polarizing direction on the windshield but reflects visible light becoming light of P-polarization as the polarizing direction on the windshield.

7. The vehicle according to claim 3,
wherein the opening of the housing is provided with a transparent cover.

* * * * *